United States Patent
Burmester

(10) Patent No.: US 12,025,232 B2
(45) Date of Patent: Jul. 2, 2024

(54) VALVE AND CLEANING METHOD

(71) Applicant: GEA Tuchenhagen GmbH, Büchen (DE)

(72) Inventor: Jens Burmester, Grambek (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 17/794,414

(22) PCT Filed: Jan. 22, 2021

(86) PCT No.: PCT/EP2021/051414
§ 371 (c)(1),
(2) Date: Jul. 21, 2022

(87) PCT Pub. No.: WO2021/148583
PCT Pub. Date: Jul. 29, 2021

(65) Prior Publication Data
US 2023/0062350 A1  Mar. 2, 2023

(30) Foreign Application Priority Data
Jan. 24, 2020  (DE) .................... 10 2020 000 450.4

(51) Int. Cl.
*F16K 31/122* (2006.01)
*F16K 1/44* (2006.01)
(52) U.S. Cl.
CPC .......... *F16K 1/446* (2013.01); *F16K 31/1225* (2013.01)

(58) Field of Classification Search
CPC ............................. F16K 1/446; F16K 31/1225
See application file for complete search history.

(56) References Cited

U.S. PATENT DOCUMENTS 1,724,017 A * 8/1929 Godfrey ................. F16K 1/446
137/313
3,643,679 A    2/1972 Hansson
(Continued)

FOREIGN PATENT DOCUMENTS

DE         41 18 874 A1   12/1992
DE     10 2011 103371 A1  12/2012
(Continued)

*Primary Examiner* — Umashankar Venkatesan
(74) *Attorney, Agent, or Firm* — Young Basile Hanlon & MacFarlane, P.C.

(57) ABSTRACT

A valve has a housing that delimits an interior, a first connection, a second connection, a passage that fluidically connects the first and second connections, first and second closing elements received in the interior and surrounding an intermediate space connected to a third connection, and an adjustment device that, in a closed position, brings the first closing element into sealing contact with a first valve seat formed in the passage and the second closing element into sealing contact with a second valve seat formed in the passage. The first closing element is sealingly received in the second closing element. For cleaning, the adjustment device forms a gap that connects the intermediate space to the interior, between the first and second closing elements and simultaneously releases the first and second closing elements from the first and second valve seats in an open position. A cleaning method is also described.

16 Claims, 3 Drawing Sheets

(56) References Cited

U.S. PATENT DOCUMENTS

| | | | | |
|---|---|---|---|---|
| 4,254,792 | A * | 3/1981 | Schadel | F16K 1/446 137/614.16 |
| 5,806,554 | A | 9/1998 | Mieth | |
| 6,089,255 | A * | 7/2000 | Bonnefous | F16K 1/446 251/63.5 |
| 6,179,003 | B1 * | 1/2001 | Burmester | F16K 31/1225 251/63.5 |
| 7,905,253 | B2 * | 3/2011 | Burmester | F16K 1/446 137/240 |
| 8,327,881 | B2 * | 12/2012 | Norton | F16K 31/1225 137/614.17 |
| 8,336,572 | B2 * | 12/2012 | Burmester | F16K 1/446 137/240 |
| 8,459,294 | B2 * | 6/2013 | Burmester | F16K 1/446 137/240 |
| 8,596,298 | B2 * | 12/2013 | Burmester | F16K 1/446 137/240 |
| 11,041,578 | B2 * | 6/2021 | Priisholm | F16K 37/0041 |
| 11,156,297 | B2 * | 10/2021 | Burmester | F16K 1/50 |
| 2006/0108550 | A1 | 5/2006 | Burmester | |
| 2020/0217425 | A1 | 7/2020 | Burmester et al. | |

FOREIGN PATENT DOCUMENTS

| | | |
|---|---|---|
| EP | 0 625 250 A1 | 11/1994 |
| EP | 0 646 741 B1 | 9/1996 |
| EP | 1 525 415 A1 | 4/2005 |
| EP | 1 581 757 A1 | 10/2005 |
| WO | 9316307 A1 | 8/1993 |
| WO | 2004/015314 A1 | 2/2004 |
| WO | 2004/063609 A1 | 7/2004 |
| WO | 2009/115255 A1 | 9/2009 |
| WO | 2019/020361 A1 | 1/2019 |

* cited by examiner

VALVE AND CLEANING METHOD

TECHNICAL FIELD

The invention relates to a valve used in systems for the production of food products, beverages, medicines, and fine chemical products, as well as in biotechnology, and more particularly to a hygienic design of the valve where thorough cleaning is possible.

BACKGROUND

A type of valve with the designation double seat valve is known, in which two closing elements can be brought into sealing contact with a respectively associated valve seat. A so-called leakage chamber is located between the closing elements. It is desirable to reliably clean the valve seats. This is achieved in double seat valves with cleanable seats. Said double seat valves are configured to lift up one closing element at a time from its associated valve seat, while the other closing element remains in sealing contact. Cleaning liquid flows over the exposed valve seat and cleans it and the closing element. The liquid can be discharged through the leakage chamber.

WO 2009/115255 A1 and EP 0 646 741 B1 show double seat valves with cleanable seats in which a seal on a valve rod can also be exposed for cleaning in a cleaning step. Both documents show such arrangements; EP 0 646 741 B1 additionally shows a cleaning of the actuator-side seal that is designed to slide on a closing element section. An even older document is DE 41 18 874 A1, which also shows a cleaning of the actuator-side seal.

In EP 0 646 741 B1, the cleaning position for said seal is coupled to the cleaning position of the main seals on the valve seats. The actuator operated by a pressure medium is therefore designed to perform a partial stroke in addition to the full stroke or main stroke. DE 41 18 874 A1 and WO 2009/115255 A1 do not offer any more details on the actuators.

Double seat valves with cleanable seats may be designed as so-called tank bottom valves, with which the outlet of a tank can be connected to a pipeline system in a switched manner. WO 2019/020361 A1 proposes such a tank bottom valve.

SUMMARY

It is an object of the invention to improve the cleanability of the valve and to propose a cleaning method.

The invention is based on the observation that, in terms of process technology, the known cleaning positions are not the only ones available for cleaning the valve. Contrary to the approach taken in the prior art, it is also possible to clean parts in an open position of the valve that were previously inaccessible in this switching position. It is therefore proposed to open an intermediate space, surrounded by a first and a second closing element, towards the interior of the valve. The intermediate space, also called leakage space, is used to discharge and make visible leakage that may occur due to wear of seals on the closing elements. The opening of the intermediate space toward the interior is achieved by a gap between the first and second closing elements. Therefore, the adjustment device for adjusting the closing elements is configured to additionally create a gap between the closing elements when they are simultaneously lifted from their respective assigned valve seat. This provides a powerful cleaning stream that cleans the gap and the closing elements to an unprecedented degree. This is particularly advantageous in so-called tank bottom valves because in this application a low pressure of the cleaning liquid entering through the connection of the valve to which the tank is connected is regularly observed.

In a first further development, it is provided that the adjustment device comprises an assembly that interacts with one of the closing elements and adjusts said closing element into the open position relative to another closing element, forming the gap. An additional assembly specifically provided for this functionality in the adjustment device allows this novel cleaning position to be executed better. The assembly allows the adjustment device to be set for the best possible actuation of the closing elements, in particular with regard to the gap width. The control forces can also be optimized. Conceivable operating principles for this assembly are, for example, based on the electromagnetic, hydraulic or pneumatic principles used in the prior art.

Advantageously, according to a development, the assembly is provided with a piston to which a pressure medium can be applied, for example air, and that, under the action of the pressure medium, effects the additional position according to claim 1 by shifting the position.

An economical and reliable embodiment provides for the piston to interact with a shoulder on one of the valve rods of a closing element. When pressure is applied, the piston engages the shoulder so that the valve rod is entrained when the piston moves.

Advantageously, an adjustment device configured to adjust the closing elements can be of modular design with at least two actuator modules, one of the actuator modules being designed to effect the additional cleaning position. This is economical to manufacture and also permits adaptation at the customer's premises, i.e., in the processing system. The actuator modules are preferably detachably coupled to one another and are arranged in a row.

When the adjustment device is constructed from actuator modules, it is advantageous to arrange the assembly in an independent actuator module. The design is preferably chosen so that this actuator module can be integrated into the adjustment device in a retrofitable manner. To this end, said adjustment device can comprise its own sections of valve rods that can be coupled to the rods of the valve and the other actuator modules.

The advantages of modularity can be increased if the adjustment device comprises an actuator module that controls the closing elements to move them to a position corresponding to the open position of the valve.

A simple, economical design of the actuator modules is possible if the actuator module comprising the assembly is arranged between the housing of the valve and the actuator module causing the open position of the valve. This makes modifications to the previously known actuator modules for the open position unnecessary.

The advantages of modularity are achieved in greater depth and at low cost, and in particular easy retrofitting is made possible, if at least one of the valve rods of the valve, preferably all the valve rods, is of a multi-part construction or design. The multi-part design is chosen so that it supports the modularity. This is the case, for example, if the parts of the valve rod extend only over individual actuator modules.

The method according to claim 10 provides for lifting both closing elements from their associated valve seats and, at the same time, forming a gap between the closing elements, which gap connects the intermediate space and the interior. In this way, the cleaning process is extended to include a position of the closing elements in which a cleaning agent is admitted into the valve and then effects thorough cleaning.

BRIEF DESCRIPTION OF THE DRAWINGS

The invention will be explained in more detail on the basis of an embodiment and its further embodiments. In addition, the presentation of the advantages is explained in more detail with reference to the drawings.

DETAILED DESCRIPTION

Figure 1:
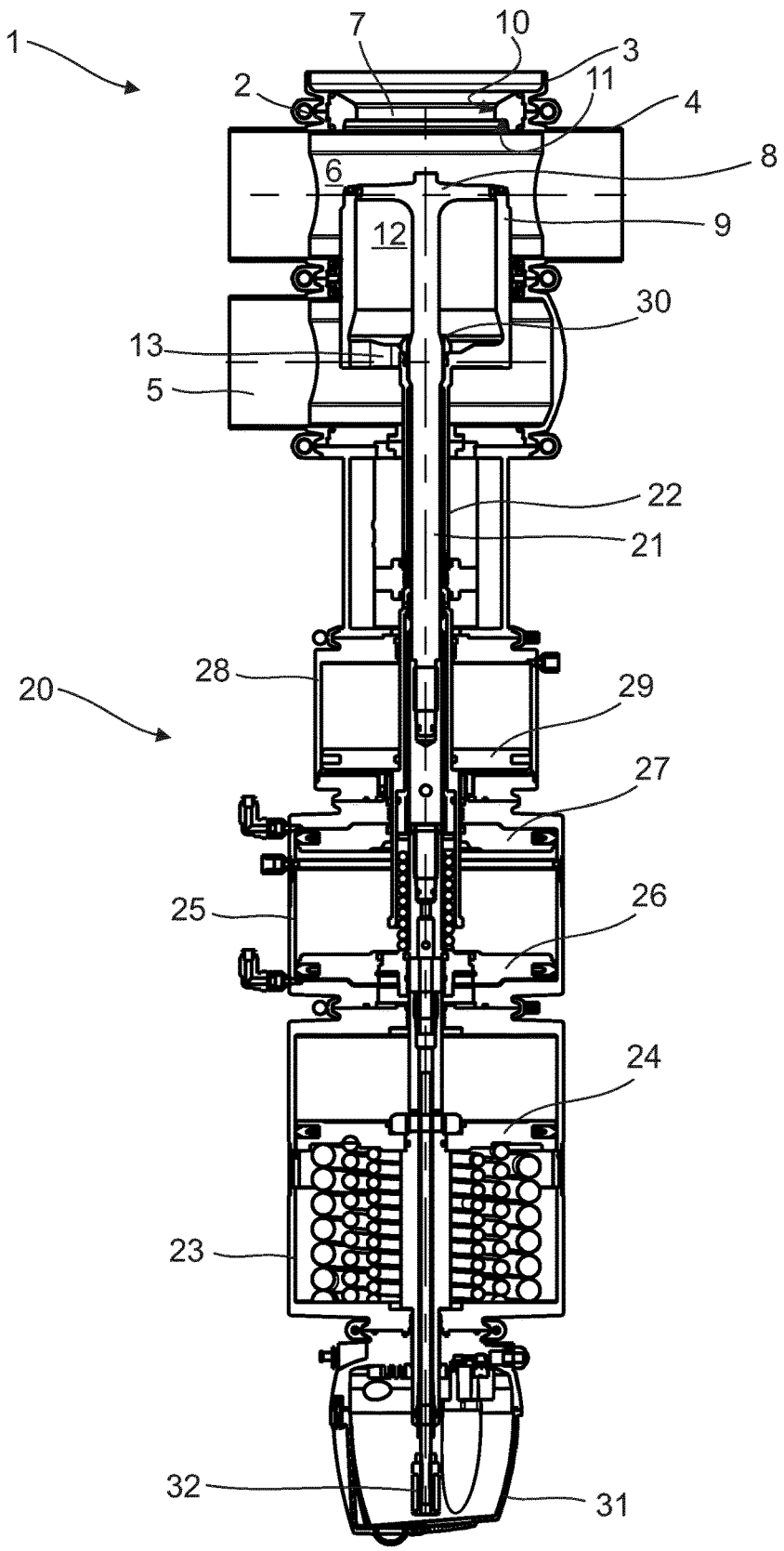
FIG. 1 is a double seat valve in tank bottom design in open position.

FIG. 1 shows a longitudinal sectional view through a cleanable valve 1 that can be connected to a tank.

The valve 1 comprises a one-part or multi-part housing 2 with a first connection 3, which can be connected to a tank or vessel (not shown). Said connection may be accomplished by means of a clamping flange or a weld. On the housing 2, a second connection 4 is formed, which can be connected to a pipe of a processing system. A third connection 5 is provided, which can be connected to an apparatus for leakage indications and/or discharge. The housing defines an interior 6 that fluidically connects the first and second connections 3 and 4 to one another. A passage 7 is formed in the housing between the first and second connections 3 and 4.

A first closing element 8 and a second closing element 9 are located in the interior.

The first closing element 8 interacts with a first valve seat 10 that is formed as cylinder face in the passage 7. On a side of the first valve seat 10 facing the interior 6, a second valve seat 11 is formed, which is preferably step-shaped. Due to the step shape, the second valve seat 11 forms an axial stop that delimits the movement of the second closing element 9.

The second closing element 9 is cup-shaped. There is an intermediate space 12 in its interior. The first closing element 8 can be accommodated in the second closing element 9 such that the intermediate space 12 is sealed against the interior 6. A channel 13 is formed in the second closing element 9 on a side facing away from the first closing element 8 and creates a fluid connection of the intermediate space 12 with the third connection 5. Cleaning fluid or leakage due to leaks between valve seats and closing elements first enters the intermediate space 12 and passes through the channel 13 to the third connection 5.

The closing elements 8 and 9 can be moved by means of an adjustment device 20.

Advantageously, the adjustment device 20 is of modular design and has several actuator modules that, in this example, are operated by pressure medium and are partially spring-loaded.

A first valve rod 21 is connected to the first closing element 8, which valve rod is displaceably arranged in a second valve rod 22 designed as a hollow rod. This second valve rod 22 is connected to the second closing element 9.

The adjustment device 20 comprises a first actuator module 23, in which a first piston 24 is arranged. Said piston interacts with the first valve rod 21. The first drive module 23 allows the first closing element 8 to be moved back and forth between two positions. In the first position, the first closing element 8 is in sealing contact with the first valve seat 10. In the second position, the closing element 8 is in a retracted position within the interior 6 after moving in the direction of the adjustment device 20. The second closing element 9 is entrained during this movement, and the valve 1 is then in an open position, in which there is a flow connection between the first and second connections 3 and 4.

The adjustment device 20 comprises a second actuator module 25 detachably connected to the first actuator module 23, and in which second actuator module a second piston 26 is arranged. The second piston 26 interacts with the first valve rod 21. When a pressure medium is applied to this piston, the second piston 26 applies a force onto the first valve rod 21 and effects a displacement of the first valve rod 21 in the direction of the first connection 3. As a result, the first closing element 8 connected to the first valve rod 21 is lifted out of the first valve seat 10 to a side of the first valve seat 10 facing away from the interior 6. This position allows in particular the cleaning of the first valve seat 10. Meanwhile, the second closing element 9 is in sealing contact with the second valve seat 11 associated with it. The fluid used for cleaning now flows through the intermediate space 12, then through the channel 13 and leaves the valve through the third connection 5.

A third piston 27 is provided in the second actuator module 25. Said piston interacts with the second valve rod 22. The third piston 27 and second valve rod 22 are configured so that the second closing element 9 is lifted out of the valve seat 11 into the interior 6 when pressure is applied to the third piston 27. The first closing element 8 is still in sealing contact with the first valve seat 10. This position of the closing elements 8 and 9 allows in particular the cleaning of the second valve seat 11. In this case, the cleaning fluid is also discharged through the intermediate space 12, then through the channel 13 and the third connection 5.

The adjustment device 20 comprises a third actuator module 28 detachably connected to the second actuator module 25 and having a fourth piston 29. In order to cause an additional cleaning position, pressure can be applied to said fourth piston when pressure has already been applied to the first piston 24. However, pressure can be applied to the first piston 24 without controlling the fourth piston 29. By applying a pressure medium to the first piston 24, the first and second closing elements 8 and 9 are lifted from the first and second valve seats 10 and 11 and displaced into the interior 6. When pressure is applied, the fourth piston 29 engages with the second valve rod 22 and displaces it and thus consequently the second closing element 9 in the direction of the adjustment device 20. This creates a gap between the first and second closing elements 8 and 9, which enables the cleaning agent from the interior 6 to enter the intermediate space 12. A particularly powerful cleaning flow is provided, so that in this position of the first and second closing elements 8 and 9, all surfaces of valve 1 in contact with the product, including the interior 6 and the intermediate chamber 12, are thoroughly cleaned. The valve 1 thus clearly surpasses the hygienic properties of the previous valves of the prior art.

The modular design of the adjustment device 20 presented in this example, with three actuator modules 23, 25 and 28, enables the economical adaptation of the valve arrangement to customer requirements. In particular, retrofitting the third drive module 28 with the additional cleaning position is also possible on existing systems and their valves.

The valve 1 may additionally comprise a spray nozzle 30 arranged in the second closing element 9 and surrounding the first valve rod 21 as it emerges from the second valve rod 22. Cleaning fluid can be applied to this spray nozzle 30 through a gap between the first and second valve rods 21 and 22.

The appropriate pressurization of the pistons 24, 26, 27 and 29 can advantageously be provided by a control head 31 equipped with pressure setting valves, which is attached to the valve 1. The pressure setting valves are controlled according to the specifications, which are transmitted from a system control to an electronic system of the control head 31. The control 31 may comprise a measuring means that determines the position of a measurement target 32 arranged on the first valve rod 21. From this, the position of first and second closing elements 8 and 9 can be inferred. This information can be transmitted to the system control.

Figure 2:
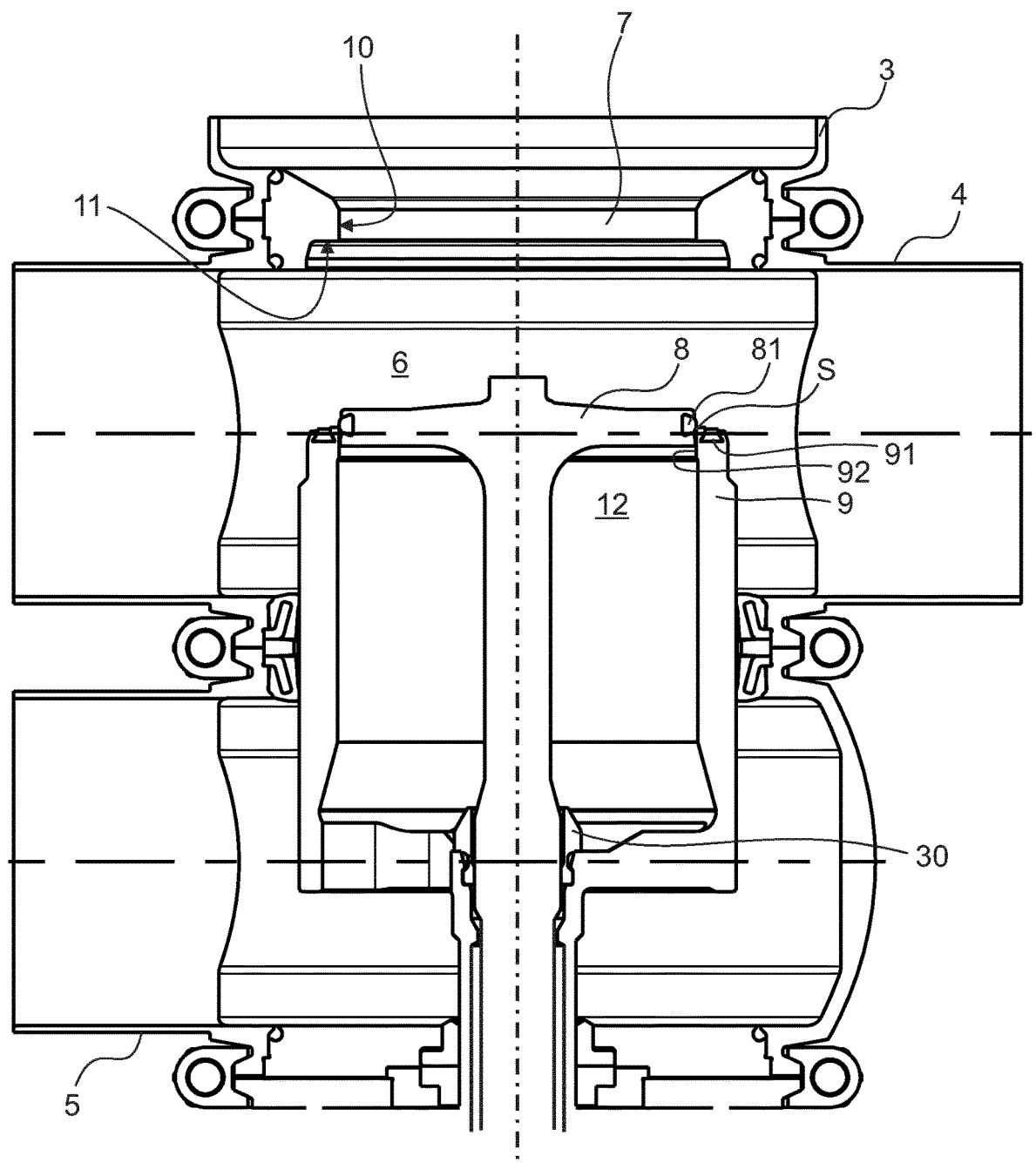
FIG. 2 is the double seat valve according to an example with an additional cleaning position in sectional view.

In FIG. 2, the additional cleaning position of valve 1 is illustrated in a detailed view. The first closing element 8 and the second closing element 9 are retracted into the interior 6, opening up passage 7 so that fluid can flow between the first connection 3 and the second connection 4.

The first valve seat 10, which in the closed position of the valve 1 is in sealing contact with a first seal 81 provided on the first closing element 8, is exposed in this position of the valve 1. Likewise, the second valve seat 11, which in the closed position of the valve 1 is in sealing contact with a first seal 91 provided on the first closing element, is now also exposed. Advantageously, the first seal 81 may be designed as a radial seal and the second seal 91 as an axial seal. The radial design of the first seal 81, in particular, allows the first closing element 8 to be moved beyond the passage 7 into the first connection 3 on the one hand and into the second closing element 9.

In the regular open position of the valve 1, the first and second closing elements 8 and 9 are also retracted into the interior 6 and the passage 7 is open, thus the passage 7 is permeable to fluid. However, in the open position, the first seal 81 is in sealing contact with an inner seat 92 provided on the second closing element 9. Said inner seat is designed so that the interior 6 and the intermediate space 12 in the second closing element 9 are fluidically separated from each other.

In the position shown in FIG. 2, however, the first closing element 8 and the second closing element 9 are displaced relative to one another so that, although the passage 7 is opened, the first seal 81 is not in sealing contact with the inner seat 92. A gap S is formed between the first and second closing elements 8 and 9, which allows fluid flow. The gap width can advantageously be dimensioned so that the resulting flow through the gap S causes cleaning of the first seal 81 and the inner seat 92 as well as surfaces of the first and second closing elements 8 and 9 adjacent to the seal and seat. To achieve the position shown in FIG. 2, it is advantageous to displace the second closing element 9 in the direction of the adjustment device 20, in FIG. 2 downwards, and thus away from the passage 7, thereby exposing the second closing element. This improves the cleaning result.

Figure 3:
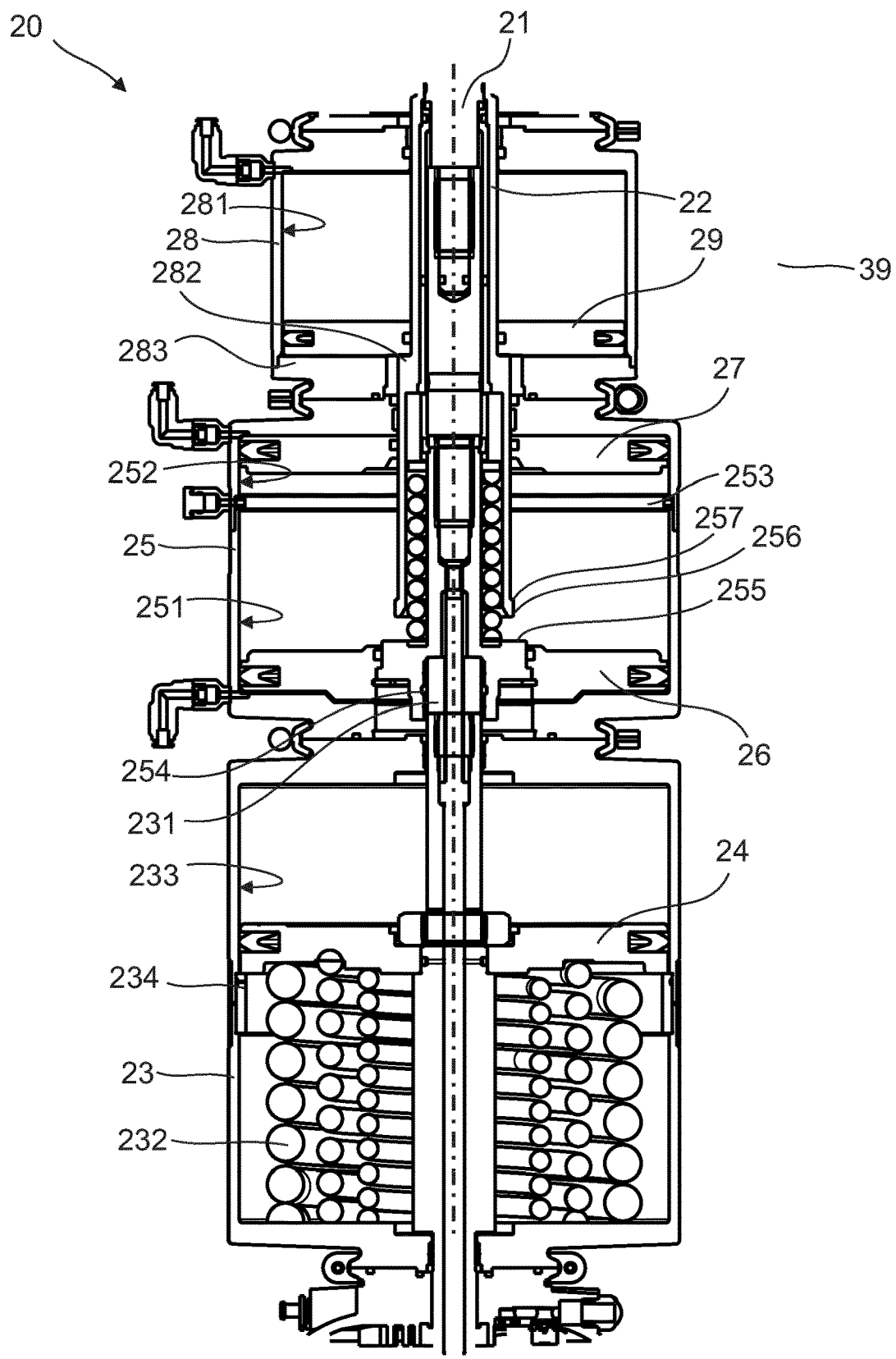
FIG. 3 is an adjustment device for the double seat valve according to an example.

The structure of the adjustment device 20 of this example is shown in more detail in FIG. 3.

The first actuator module 23, which moves the valve 1 to an open position by displacing the first and second closing elements 8 and 9 into the interior 6, comprises the first piston 24. The first piston 24 is mounted on an actuator rod 231 so that a movement of the first piston 24 results in a movement of the actuator rod 231. A movement of the first piston 24 can be effected by applying a pressure medium. The first piston 24 is displaced by applying a pressure medium, e.g., compressed air, against the force of a spring 232 or spring assembly. Displacement of the first piston 24 occurs in sliding contact with a first running surface 233, which may be shaped as a cylindrical surface. The displacement is limited by a first stop 234. The first stop 234 may be designed as a circumferential protrusion which may be shaped as a ring-like component.

The second actuator module 25 is arranged on a side of the first actuator module 23 facing the closing elements 8 and 9 and the housing 2 and is connected thereto. The connection is advantageously designed to be detachable, whereby the second drive module 25 is a separate commercial unit.

The second piston 26 is displaceably arranged in the second actuator module 25. The displacement takes place in sliding contact with a second running surface 251. Also displaceably arranged in the second actuator module 25 is the third piston 27, which is in sliding contact with a third running surface 252. A pressure medium can be applied to both pistons 26 and 27 to effect the displacement. Applying pressure to one of the pistons 26 and 27 results in a movement in the direction of the respective other piston. A second stop 253 is provided between the pistons 26 and 27 and the running surfaces 251 and 252, which stop is designed as a ring-shaped component and forms a protrusion for each of the cylindrical running surfaces 251 and 252. This way, one component forms the movement limitation for both pistons 26 and 27.

The second actuator module 25 is configured to bring one of the respective closing elements 8 and 9 into a cleaning position, in which one of the closing elements is lifted off the valve seat 10 and 11 associated with it, while the respective other closing element 8 and 9 remains in sealing contact. For this purpose, the second running surface 251 and second stop 253 are dimensioned to allow a longer stroke of the second piston 26 than the stroke of the first piston 24. The actuator rod 231 is displaceably received in a sliding bushing 254, which sliding bushing 254 is provided in a hub 255 of the second piston 26. By displacing first piston 24, the first closing element 8 is brought into sealing contact with the first valve seat 10. In the process, the second piston 26 is entrained. Pressurization of the second piston 26 now moves it to the second stop 253 and presses the first closing element out of the first valve seat 10 into the first connection 3 via the second valve rod 22. In the process, the actuator rod 231 is pulled out of the slide bushing 254 to a certain extent.

The cleaning position of the second closing element 9 is brought about by the third piston 27 by applying a pressure medium to the third piston 27 and thereby moving it in the direction of the second piston 26. The third piston 27, which is displaceably arranged in sliding contact on the second valve rod 22, thereby comes into contact with a fourth stop 257 formed at the end 256 of the second valve rod. As a result, the second valve rod 22 is entrained until the third piston 27 arrives at the second stop 253. The movement of the second valve rod 22 triggered in this way lifts the second closing element 9 off the second valve seat 11.

In the third actuator module 28, the fourth piston 29 is displaceably arranged on the second valve rod 22 and interacts with a fourth running surface 281 provided on a housing. A shoulder 282 is formed on the second valve rod 22, which acts as a stop for the fourth piston 29. When a pressure medium is applied to the fourth piston 29, said fourth piston is moved in the direction of the other actuator modules 23 and 25 until it reaches a travel limit 283 on the housing side. Before reaching this travel limit 283, the fourth piston 29 comes into engagement with the shoulder 282 and subsequently entrains the second valve rod 22. As a result, in the open position of the valve 1, the closing elements 8 and 9 are moved apart as shown in FIG. 2 until the desired gap S has been achieved.

The modularity of the structure is improved if at least one of the valve rods 21 and 22, preferably both, has a multi-part structure, the rod sections preferably being associated with the individual modules 23, 25 and 28.

This modularity of the adjustment device 20 is advantageous because individual functions such as cleaning positions of the individual closing elements can be subsequently installed by retrofitting the second drive module 25. The additional cleaning position, which is effected by the third drive module 28, can also be retrofitted. In this way, on the one hand, production costs can be reduced and, on the other hand, customer requirements can be specifically satisfied by an adjustment device 20 tailored to the customer.

The invention was described using the example of a tank bottom valve, but the invention can also be applied to valves according to WO 2009/115255 A1.

The following is a list of reference numbers used in the drawings and this description.

1 Valve
2 Housing
3 First connection
4 Second connection
5 Third connection
6 Interior
7 Passage
8 First closing element
9 Second closing element
10 First valve seat
11 Second valve seat
12 Intermediate space
13 Channel
20 Adjustment device
21 First valve rod
22 Second valve rod
23 First actuator module
24 First piston
25 Second actuator module
26 Second piston
27 Third piston
28 Third actuator module
29 Fourth piston
30 Spray nozzle
31 Control head
32 Measuring target
81 First seal
91 Second seal
92 Inner seat
231 Actuator rod
232 Spring assembly
233 First running surface
234 First stop
251 Second running surface
252 Third running surface
253 Second stop
254 Slide bushing
255 Hub
256 End of second valve rod
257 Fourth stop
281 Fourth running surface
282 Shoulder
283 Travel limit
S Gap

The invention claimed is:

1. A method for cleaning a valve having an intermediate space that can be delimited from an interior by a first closing element and a second closing element and having a first valve seat associated with the first closing element and a second valve seat associated with the second closing element, wherein in a closed position of the valve, the first closing element is brought into sealing contact with the first valve seat and the second closing element is brought into sealing contact with the second valve seat, the method comprising:
  bringing the first closing element into a position lifted from the first valve seat and the second closing element into a position lifted from the second valve seat; and
  at a same time, forming a gap between the first closing element and the second closing element, which gap connects the intermediate space with the interior.

2. A valve, comprising:
  a housing that delimits an interior;
  a first connection;
  a second connection;
  a passage that fluidically connects the first connection to the second connection;
  a first closing element and a second closing element, wherein the first closing element and the second closing element are received in the interior and surround an intermediate space that is connected to a third connection; and
  an adjustment device configured to, in a closed position of the valve, bring the first closing element into sealing contact with a first valve seat formed in the passage and the second closing element into sealing contact with a second valve seat formed in the passage and, in an open position of the valve, release the first closing element from the first valve seat and the second closing element from the second valve seat, wherein:
    the first closing element is sealingly received in the second closing element, and
    the adjustment device is configured to:
      simultaneously form a gap between the first closing element and the second closing element connecting the intermediate space to the interior when the first closing element is lifted from the first valve seat and the second closing element is lifted from the second valve seat, and
      simultaneously release the first closing element from the first valve seat and the second closing element from the second valve seat.

3. The valve according to claim 2, wherein the adjustment device comprises an assembly interacting with one of the first closing element or the second closing element and adjusting the one of the first closing element or the second closing element into the open position with respect to the other of the first closing element or the second closing element, forming the gap.

4. The valve according to claim 3, wherein the assembly comprises a piston which a pressure medium can be applied.

5. The valve according to claim 4, wherein the adjustment device comprises at least two actuator modules.

6. The valve according to claim 4, wherein the adjustment device comprises an actuator module that causes the open position of the valve.

7. The valve according to claim 4, characterized in that the piston interacts with a shoulder on a valve rod of the second closing element.

8. The valve according to claim 3, wherein the adjustment device comprises at least two actuator modules.

9. The valve according to claim 8, comprising:
- at least one valve rod, wherein the at least one valve rod is of multi-part construction having parts that respectively extend only over an individual actual module of the at least two actuator modules.

10. The valve according to claim 3, wherein the assembly is arranged in an independent actuator module.

11. The valve according to claim 3, wherein the adjustment device comprises a first actuator module that causes the open position of the valve.

12. The valve according to claim 11, further comprising: a second actuator module wherein the second actuator module comprises the assembly and is arranged between the housing and the first actuator module causing the open position.

13. The valve according to claim 2, comprising:
- a first valve rod coupled to the first closing element; and
- a second valve rod coupled with the second closing element.

14. The valve according to claim 13, wherein at least one of the first valve rod or the second valve rod is of multi-part construction.

15. The valve according to claim 2, wherein the adjustment device comprises at least two actuator modules.

16. The valve according to claim 2, wherein the adjustment device comprises an actuator module that causes the open position of the valve.

* * * * *